(12) United States Patent
Scott et al.

(10) Patent No.: US 9,359,079 B2
(45) Date of Patent: *Jun. 7, 2016

(54) SLIDER SEAT FOR AIRCRAFT

(71) Applicant: Molon Labe LLC, Breckenridge, CO (US)

(72) Inventors: Frank Matthew Scott, Breckenridge, CO (US); Kevin Lee Van Liere, Louisville, CO (US)

(73) Assignee: MOLON LABE LLC, Breckenridge, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,110

(22) Filed: Dec. 2, 2014

(65) Prior Publication Data

US 2015/0166181 A1 Jun. 18, 2015

Related U.S. Application Data

(63) Continuation-in-part of application No. 14/467,744, filed on Aug. 25, 2014, now abandoned, which is a continuation of application No. 14/196,945, filed on Mar. 4, 2014, now abandoned, said application No. 14/467,744 is a continuation of application No. 13/545,666, filed on Jul. 10, 2012, now Pat. No. 8,708,410.

(60) Provisional application No. 61/772,832, filed on Mar. 5, 2013, provisional application No. 61/572,071, filed on Jul. 11, 2011.

(51) Int. Cl.
*B60N 2/01* (2006.01)
*B64D 11/06* (2006.01)

(52) U.S. Cl.
CPC ........ *B64D 11/0601* (2014.12); *B64D 11/0639* (2014.12); *B64D 11/0693* (2013.01)

(58) Field of Classification Search
CPC . B64D 11/06; B64D 11/0601; B64D 11/0693
USPC .................................. 297/234, 236, 237, 248
See application file for complete search history.

(56) References Cited

U.S. PATENT DOCUMENTS

| | | | |
|---|---|---|---|
| 151,411 | A | 5/1874 | Marshall |
| 371,091 | A | 10/1887 | Miller |
| 972,393 | A | 10/1910 | Moore |
| 1,643,236 | A | 9/1927 | Bell |
| 2,116,366 | A | 5/1938 | Scott |
| 2,696,246 | A | 12/1954 | Putnam |
| 3,638,997 | A | 2/1972 | Shapiro et al. |
| 4,382,628 | A | 5/1983 | Palmgren |

(Continued)

FOREIGN PATENT DOCUMENTS

| | | |
|---|---|---|
| EP | 0747286 A | 12/1996 |
| EP | 1864850 A1 | 12/2007 |

*Primary Examiner* — Rodney B White
(74) *Attorney, Agent, or Firm* — Marsh Fischmann & Breyfogle LLP

(57) ABSTRACT

An aircraft seat set is provided that allows for providing extra room for passengers and/or allow for selectively increasing the width of an aircraft aisle during enplaning and deplaning and/or increasing the width of some seats during flight. In one embodiment, the aisle seat of the seat set is movably connected to the seat frame of the seat set to allow the aisle seat to be disposed above and in front of the middle seat of the seat set for enplaning and deplaning.

9 Claims, 20 Drawing Sheets

(56) References Cited

U.S. PATENT DOCUMENTS

| | | | |
|---|---|---|---|
| 4,881,702 A * | 11/1989 | Slettebak | B64D 11/0693 244/118.6 |
| 5,104,065 A | 4/1992 | Daharsh et al. | |
| 5,131,607 A * | 7/1992 | Arnold | B64D 11/06 244/118.6 |
| 5,178,345 A * | 1/1993 | Peltola | B64D 11/0693 244/118.6 |
| 5,342,111 A | 8/1994 | Charles | |
| 5,509,722 A | 4/1996 | Beroth | |
| 5,558,309 A | 9/1996 | Marechal | |
| 5,584,532 A * | 12/1996 | Marechal | B60N 2/062 297/257 |
| 5,597,139 A * | 1/1997 | Beroth | B64D 11/0693 244/118.6 |
| 5,660,434 A | 8/1997 | Nicksic | |
| 5,673,973 A * | 10/1997 | Marechal | B60N 2/062 297/257 |
| 5,727,845 A * | 3/1998 | Jackson-Wynch | B64D 11/0693 244/118.6 |
| 5,829,836 A * | 11/1998 | Schumacher | B64D 11/0693 244/118.6 |
| 7,578,551 B2 | 8/2009 | Linero | |
| 8,091,961 B2 | 1/2012 | Dryburgh | |
| 8,118,359 B2 | 2/2012 | Kyogoku et al. | |
| 8,162,396 B2 | 4/2012 | Edwards | |
| 8,172,321 B2 | 5/2012 | Hankinson et al. | |
| 8,251,427 B2 | 8/2012 | Lindsay | |
| 8,708,410 B2 * | 4/2014 | Scott | B64D 11/06 297/234 |
| 2009/0127911 A1 | 5/2009 | Schumacher et al. | |
| 2011/0175411 A1 | 7/2011 | Wagner et al. | |

\* cited by examiner

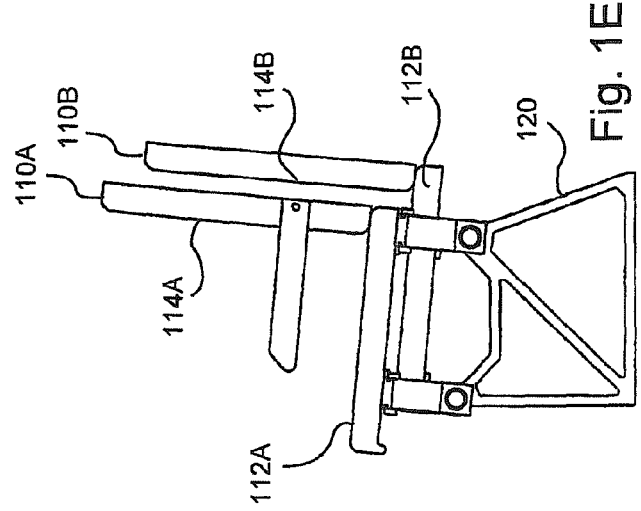
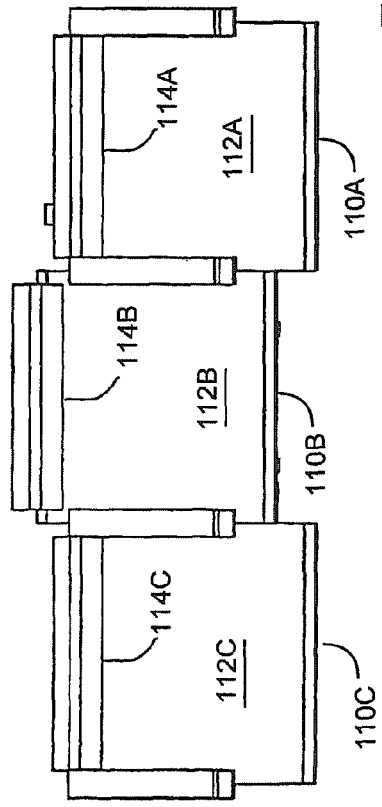
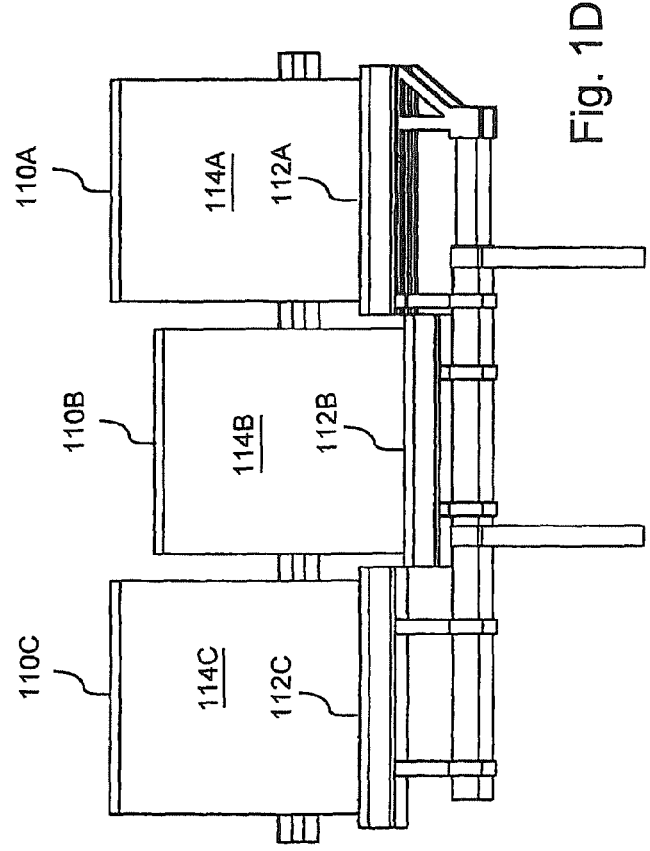

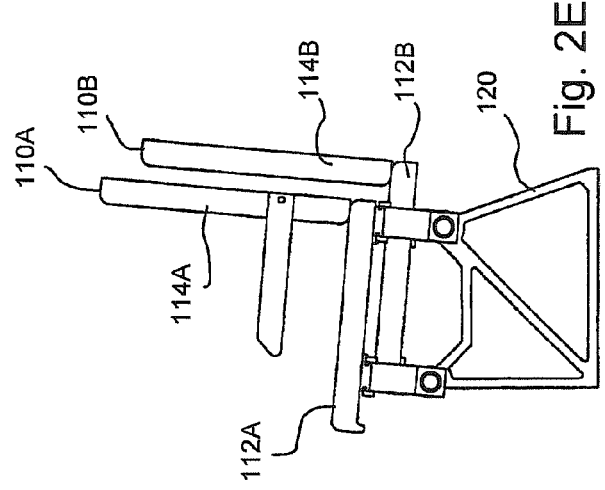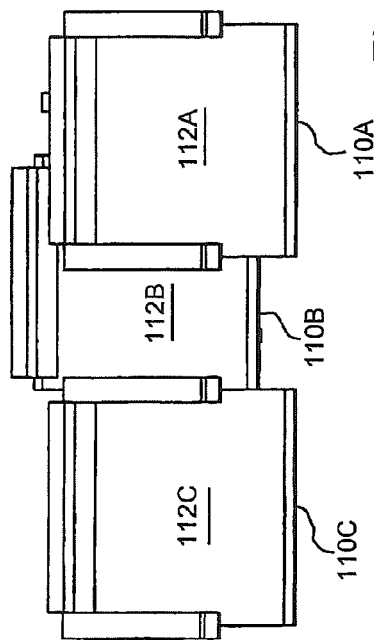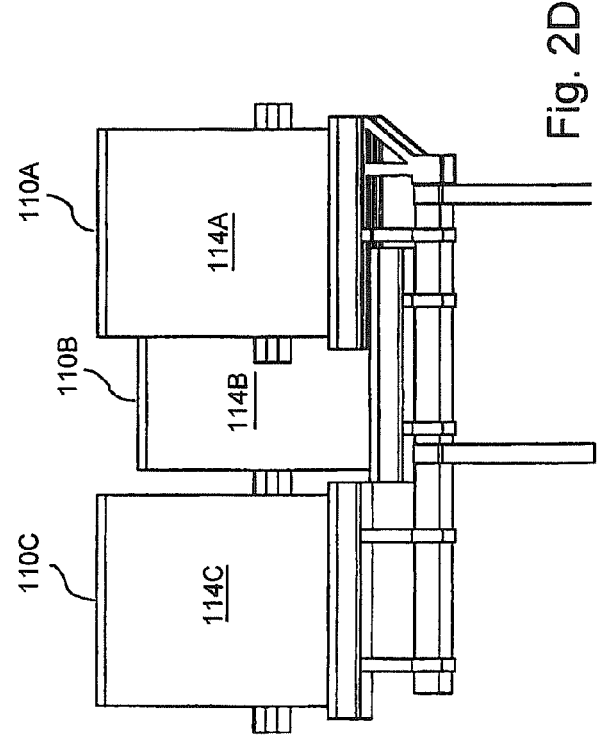

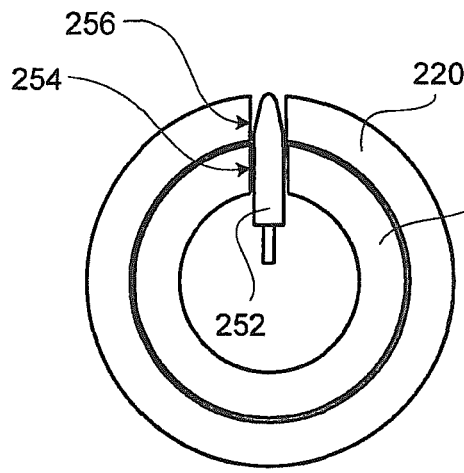
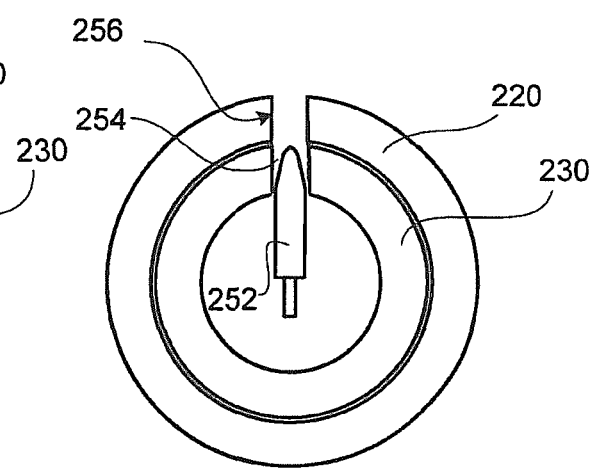
Fig. 10A    Fig. 10B
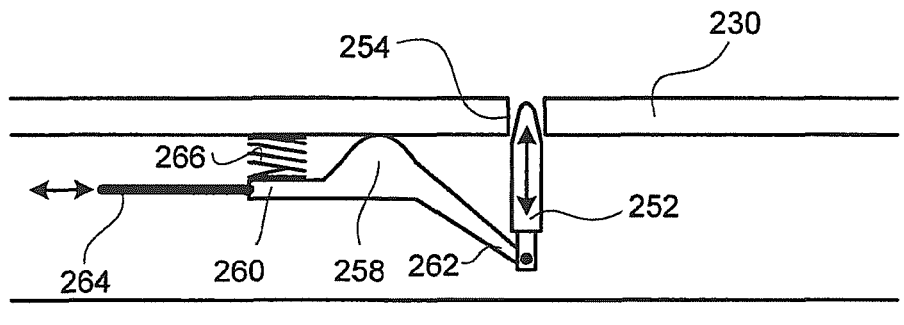
Fig. 10C
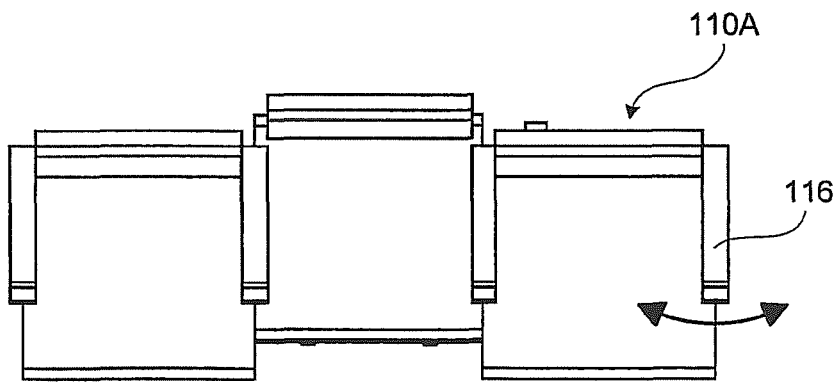
Fig. 10D

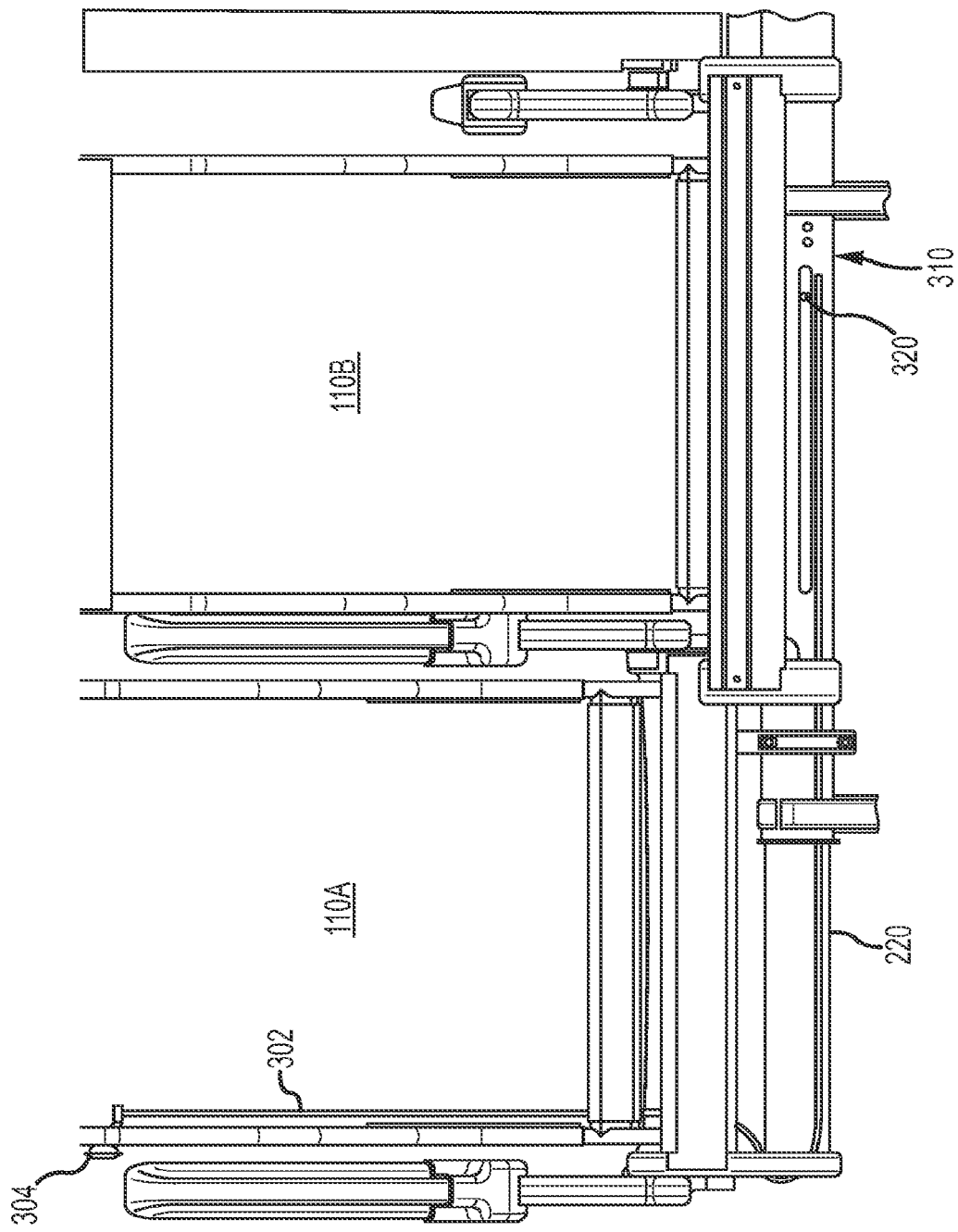

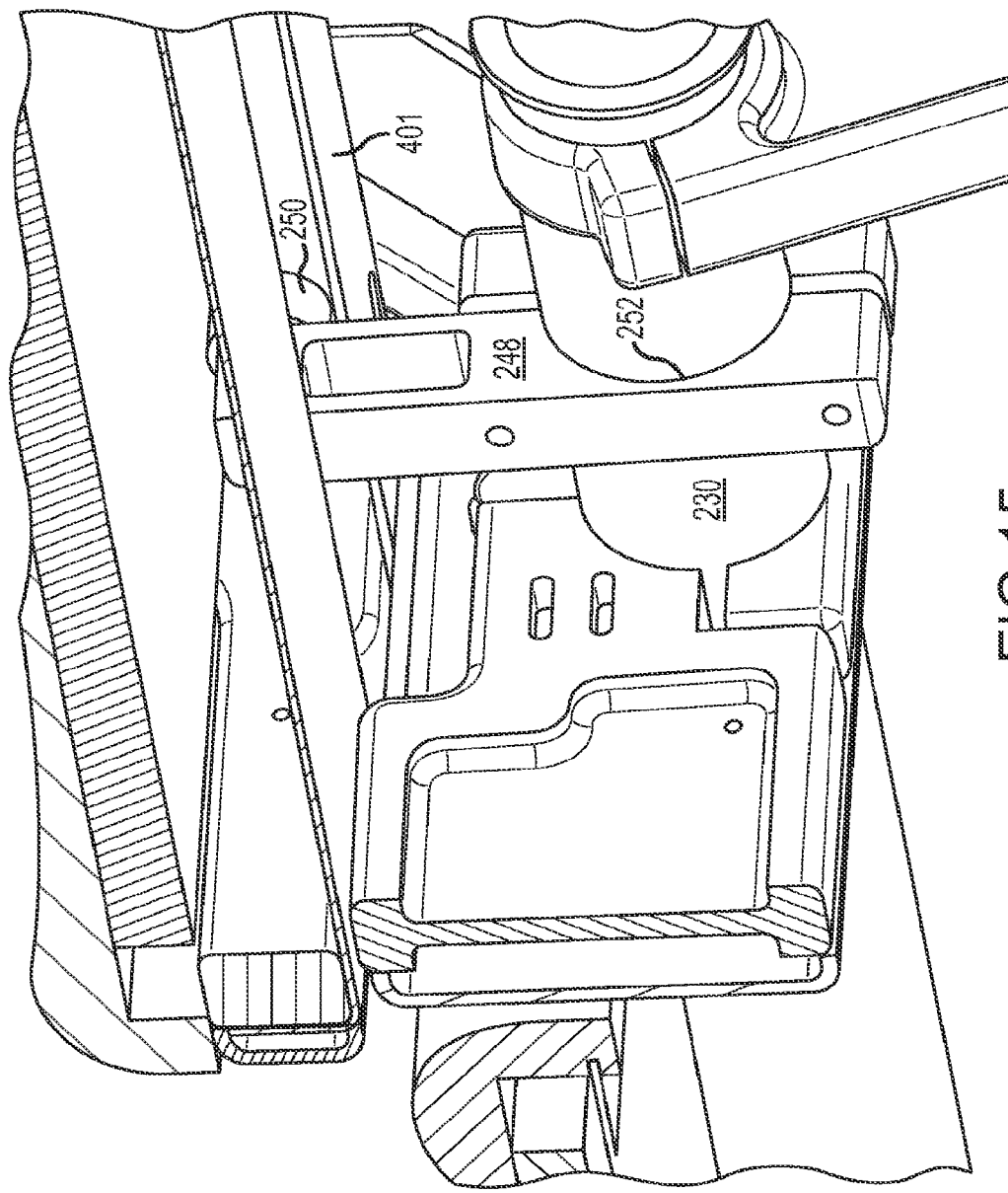

SLIDER SEAT FOR AIRCRAFT

CROSS REFERENCE

This application is a continuation-in-part of U.S. patent application Ser. No. 14/467,744, filed Aug. 25, 2014, which is a continuation of U.S. patent application Ser. No. 14/196,945, filed Mar. 4, 2014, which claims the benefit of U.S. Provisional Patent Application No. 61/772,832, filed Mar. 5, 2013, and is a continuation of U.S. patent application Ser. No. 13/545,666, filed Jul. 10, 2012, now U.S. Pat. No. 8,708,410, which claims the benefit of U.S. Provisional Patent Application No. 61/572,071, filed Jul. 11, 2011, all of which are incorporated by reference herein.

FIELD

The present disclosure is generally directed to a seating system for aircraft. More specifically, the present disclosure is directed to a seating system that allows for increasing the width of an aircraft aisle to improve boarding of an aircraft.

BACKGROUND

As airlines face increasing pressure to improve profitability, they are striving to carry the greatest number of passengers feasible while keeping their fleets in revenue service as much as possible; all without compromising passenger convenience. In this regard, it has been recognized that decreasing passenger boarding time may significantly lower the amount of time between revenue flights, and thereby increase profitability to airlines.

One way airlines can move toward this goal is to reduce airplane turn time. Turn time is the time required to unload an airplane following arrival at a gate and to ensure that the airplane is ready and loaded for its next departure. However, airplane turn time continues to increase. According to some studies, the actual speed at which passengers boarded an airplane (enplane rate) has slowed by more than 50 percent, down to as low as 9 passengers per minute since the 1970s. For many airlines the largest factor in turn time is the passenger boarding process.

Part of the increase in turn time in both enplaning and deplaning is due to the increased reliance of passengers on carry-on luggage. That is, the time required to effect passenger boarding (enplaning and deplaning) has continued to increase as more passengers utilize overhead storage bins to stow their carry-on luggage. Specifically, when a passenger stops in the aisle of an aircraft to stow or retrieve an item in the overhead bin, passengers behind the stowing/retrieving passenger cannot continue down the aisle to their seats or toward the aircraft exit. Such blockage is sometimes referred to as bottlenecking.

SUMMARY

Aspects of the presented inventions are directed to aircraft seats sets that allow for providing extra room for passengers and/or allow for selectively increasing the width of an aircraft aisle during enplaning and deplaning and/or increasing the width of some seats during flight.

According to a first aspect, an aircraft seat assembly is provided that includes at least first and second seats. One of the seats is configured to be disposed adjacent to and aircraft aisle (e.g., aisle seat). Further, this aisle seat is configured to move from a first position to a second position such that the width of the aisle may be increased during enplaning in deplaning and/or decreased during flight. More specifically, the aircraft seat assembly includes a frame having a lower end that is configured for attachment to an aircraft floor. In various arrangements, the seat frame may have a standard footprint that matches the footprint of existing seats. In such an arrangement, the aircraft seat assembly may replace existing seat assemblies with little or no modification to the existing aircraft floor. In any arrangement, the seat assembly includes at least a first seat that is fixedly interconnected to the seat frame. A second seat is interconnected to a slide member that is movably supported by the fixed seat and/or the seat frame. The slide member is adapted to move between a first position and a second position. In the first position, the second seat is disposed substantially adjacent to an outside edge of the first seat. In the second position, at least a portion of the second seat is disposed above and in front of the seating surface and seatback of the first seat. In this second position, the second seat may be moved away from the aisle such that the aisle has an increased width. A lock is utilized to affix the second seat in the first position.

To permit the second seat to move over and in front of the first seat, in one arrangement, a seating surface and seatback of the second seat is disposed above and in front, respectively, of the seating surface and seatback of the first seat. That is, the seat surface of the second seat is disposed in a horizontal plane that is above a horizontal plane defined by the seat surface of the first seat. Likewise, a seatback of the second seat is disposed in a vertical plane that is disposed in front of a vertical plane defined by the seatback of the first seat. In a further arrangement, the seating assembly may include additional seats (e.g., third seat, fourth seat etc.). In such arrangements, alternating seats may be disposed alternating planes. For instance, in a three seat arrangement the first and third seat (e.g., aisle seat and window seat) may both be disposed above and forward of the first seat (e.g., middle seat).

The slide member may be any sliding mechanism that allows for moving the second seat relative to the first seat. In one arrangement, a tube-in-tube or sleeve-in-arm mechanism is utilized. In such an arrangement, the seat frame may support a tube, sleeve or bore through which the arm may move (e.g. laterally) between the first and second positions. In such an arrangement, the second seat may be fixedly interconnected to the arm. The slide member may further include a locking mechanism or lock that allows for affixing the arm or other moving member in the first and/or second positions. In a further arrangement, the slide member may permit movement of the second/aisle seat into the aisle. In such an arrangement, the width of the first seat may be increased, for example, during flight by reducing the width of the aisle.

The slide member may further include one or more support elements that support an inside edge of the second seat when the second seat is disposed substantially adjacent to the first seat. In one arrangement, the support elements are fixedly interconnected to the frame and provide a surface that engages the inside edge of the second seat while permitting the second seat to move from the first position to the second position. In one arrangement, the support element provides a guide that moves along the length of the track that is connected to or recessed into a bottom surface of the second seat. In other arrangements, the guide may be interconnected to the bottom surface of the second seat and move along a track that is recessed into the top surface of the first seat.

According to another aspect, a seating assembly is provided that permits increasing the perceived roominess of the seats for passengers of those seats. The seat assembly includes a staggered seating arrangement where seating surfaces of adjacent seats are disposed in alternating ones of a first and second horizontal plane while the seat backs of such adjacent seats are disposed in alternating ones of a first and second vertical plane. In one such arrangement, the seating assembly includes two outboard seats and a center or middle seat. In this arrangement, the seating surfaces outboard seats may be disposed in a common plane that is above or below a plane defined by the seating surface of the middle seat. Likewise, the seatbacks of these outboard seats may be disposed in a common vertical plane that is disposed in front of or behind a vertical plane defined by the seatback of the middle seat. Typically, the outboard seats include first and second armrests. The inner armrests of both of these seats define the armrest for the middle seat. In this regard, the passenger sitting in the middle seat shares the armrest with the passengers in the outer seats. By staggering the seats, passengers are allowed to use different portions of the shared armrests and thereby are afforded additional elbowroom. Further, as the outboard seats have additional elbowroom, the width of these seats may be reduced in comparison to the width of the center seat. For instance, the center seat may have a width that is between 1.05 and 1.5 times the width of the outboard seats. In such an arrangement, the outboard seats may be identically configured. However, this is not a requirement. In a further arrangement, one of the outboard seats (e.g., aisle seat) may be attached to the slide member such that the aisle seat may move relative to the center seat.

According to another aspect, a method is provided for use in aircraft. The method includes disposing first and second seat assemblies on either side of an aisle. In a first configuration, the first and second seat assemblies define aisle having a first width. The method further includes displacing an aisle seat of at least one of the first and second seat sets to a second configuration over and above its mating seat. That is, the aisle seat is moved from first position substantially adjacent to an inboard seat to a second position at least partially above and in front of the inboard seat. In the second configuration, the aisle defined between the first and second seat sets has a second width that is greater than the width of the aisle in the first configuration.

In accordance with the present aspect, enplaning and deplaning (e.g., boarding) procedures may be provided. For instance, prior to boarding the aircraft, one or more aisle seats on one side of the plane may be moved from the first configuration to the second configuration to increase the width of the aisle. Accordingly, passengers may be loaded on a single side of the plane where the aisle seats remain in a position adjacent to their inboard seat or seats. Once boarding of the one side of the plane is completed, the aisle seats may be moved from the second configuration to this first configuration and boarding may be completed for the entire aircraft. Alternatively all passengers may board at once and those passengers sitting in the aisle seats that are displaced may wait in the increased width aisle until their seat is repositioned to its flight position.

BRIEF DESCRIPTION OF THE DRAWINGS

FIG. 1C illustrates a top plan view of the of the aircraft seat set of FIG. 1A.

FIG. 1D illustrates a front plan view of the aircraft seat set of FIG. 1A.

FIG. 1E illustrates a side plan view of the aircraft seat set of FIG. 1A.

FIG. 2C illustrates a top plan view of the of the aircraft seat set of FIG. 2A.

FIG. 2D illustrates a front plan view of the aircraft seat set of Figure A.

FIG. 2E illustrates a side plan view of the aircraft seat set of FIG. 2A.

FIGS. 10A-10D illustrates a locking mechanism for a slide mechanism.

FIGS. 14A and 14B illustrate an actuator mechanism.

FIG. 15 illustrates a roller assembly.

DETAILED DESCRIPTION

Reference will now be made to the accompanying drawings, which at least assist in illustrating the various pertinent features of the present disclosure. The following description is presented for purposes of illustration and description and is not intended to limit the disclosed inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application (s) or use(s) of the presented inventions.

Conventional passenger seats for aircraft have a support frame which supports two or three seats each of which includes a seating surface and a backrest. Commonly, a set of three adjacent seats includes four armrests that are shared by three passengers. The seat groups or eat sets are provided as units for installation in the passenger cabins of the aircraft. Most typically, a first seat set is disposed on a first side of the cabin (e.g., starboard) and a second seat set is disposed on a second side of the passenger cabin (e.g., port) with an aisle having a defined width disposed there between. Due to the narrow longitudinal corridors of the cabin, the aisle or traffic area between the rows of seats is generally narrow. During enplaning and deplaning, bottlenecking of the passengers may occur as passengers store and retrieve their luggage in compartments above the seats. In this regard, passengers behind a passenger loading or unloading their luggage are blocked from continuing up or down the aisle. That is, the aisle of the aircraft is typically too narrow to allow for passage of two passengers beside one another. Aspects of the presented invention allow for increasing the width of the aisle as well as increasing the widths of one or more seats of a seat set and providing enhanced elbow room for passengers sharing a common seat set.

Figure 1A:
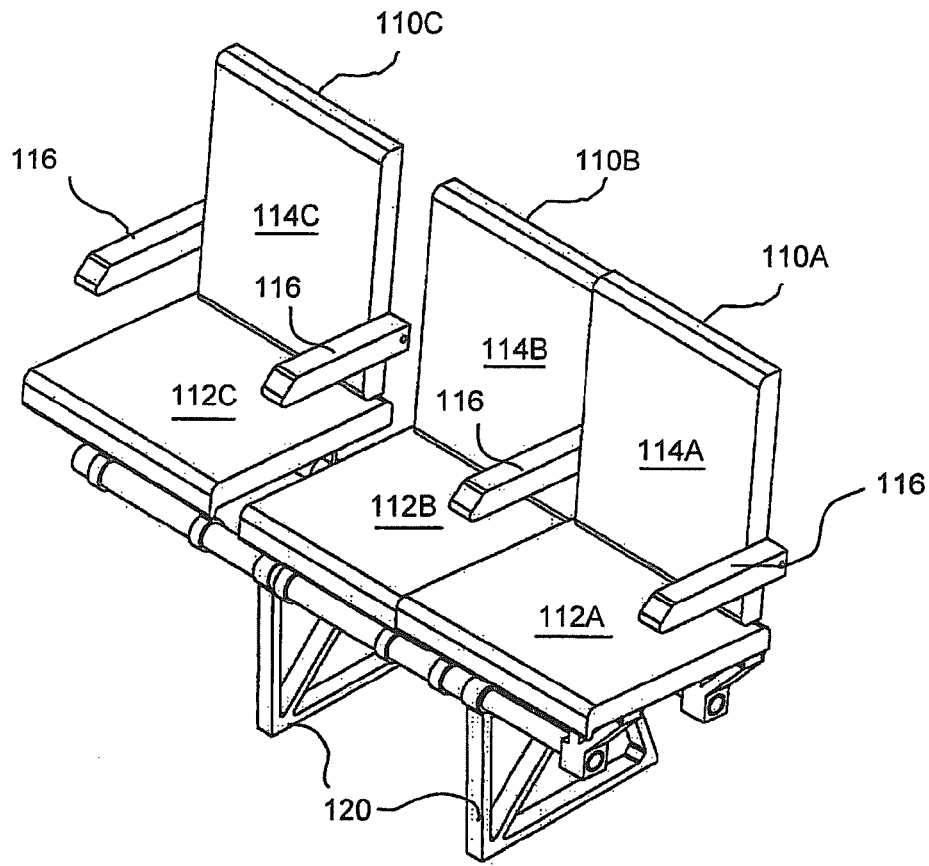
FIG. 1A illustrates a top perspective view of an aircraft seat set in an extended position.
Figure 1B:
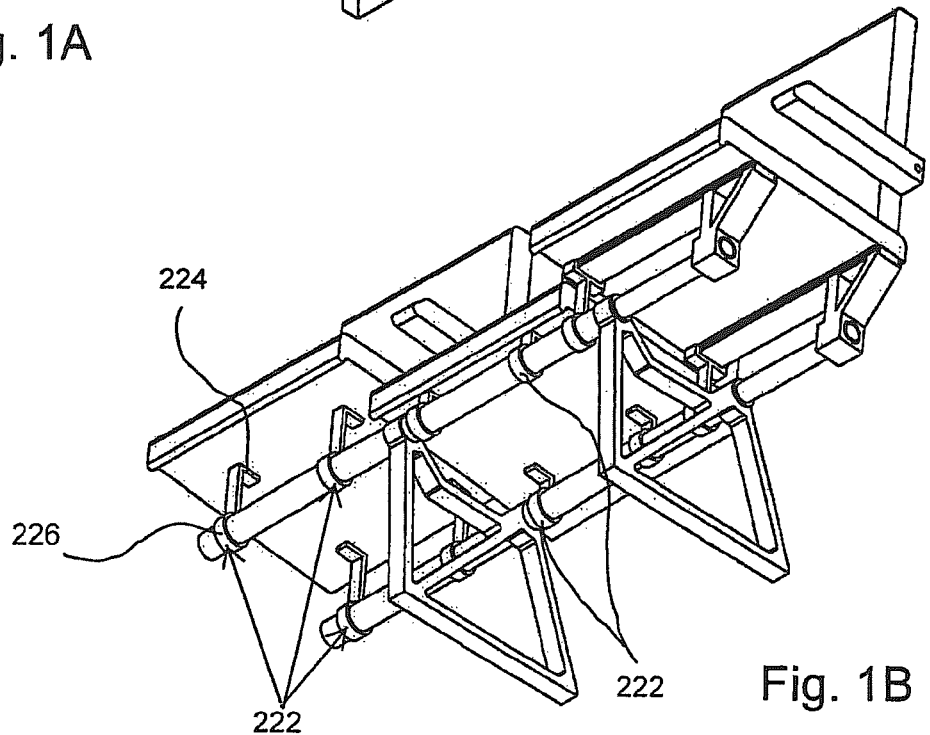
FIG. 1B illustrates a bottom perspective view of the aircraft seat set of FIG. 1A.
Figure 2A:
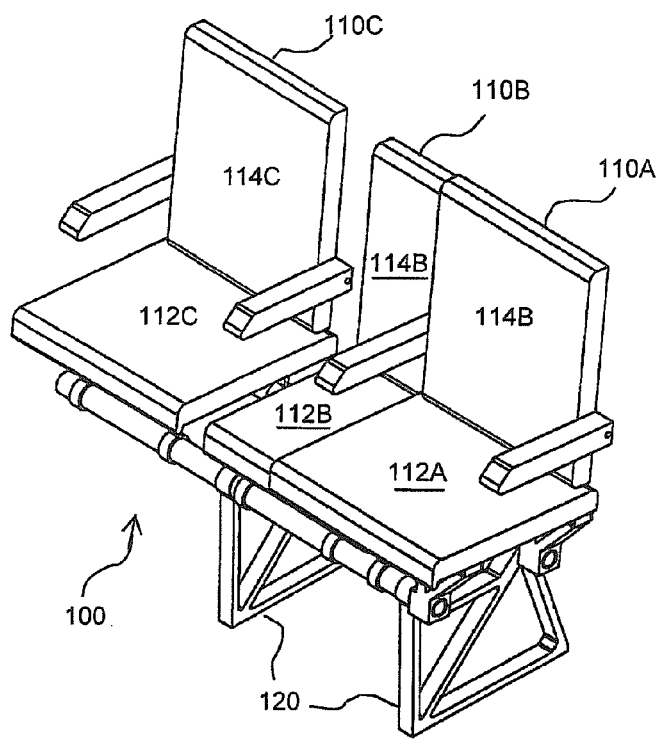
FIG. 2A illustrates a top perspective view of an aircraft seat set in a retracted position.
Figure 2B:
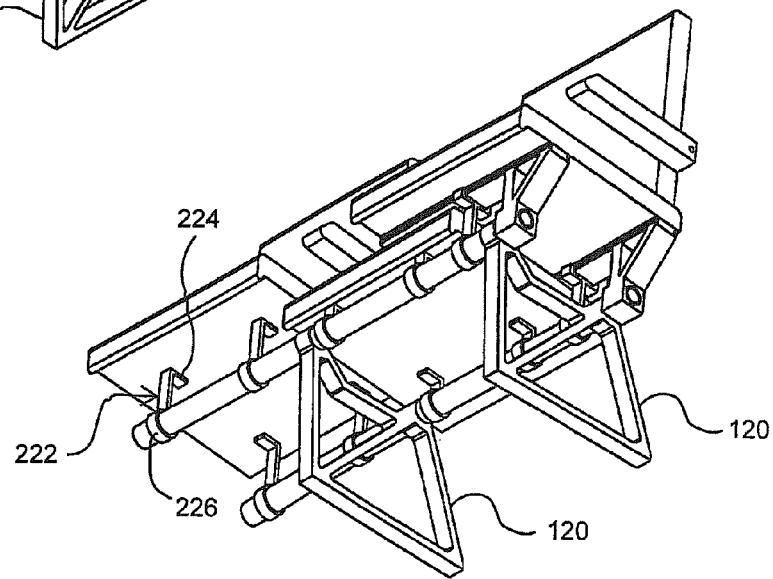
FIG. 2B illustrates a bottom perspective view of the aircraft seat set of FIG. 2A.

FIGS. 1A and 2A illustrate a perspective view of an aircraft seat set 100 in accordance with various aspects of the presented invention. As shown, the seat set 100 includes three seats 110A, 110B and 110C. These three seats 110A-110C are mounted to a common frame 120 that is adapted to be attached to a flooring surface of an aircraft cabin. The illustrated seat set 110 is adapted for use on a starboard side of an aircraft cabin. However, it will be appreciated that a mirror image of the seat set 100 may be provided for the port side of an aircraft cabin as well. Furthermore, while the current seat set 100 is illustrated utilizing three seats 110A-110C, it will be further appreciated that aspects of the seat set 100 may be utilized with more or fewer seats.

Figure 12:
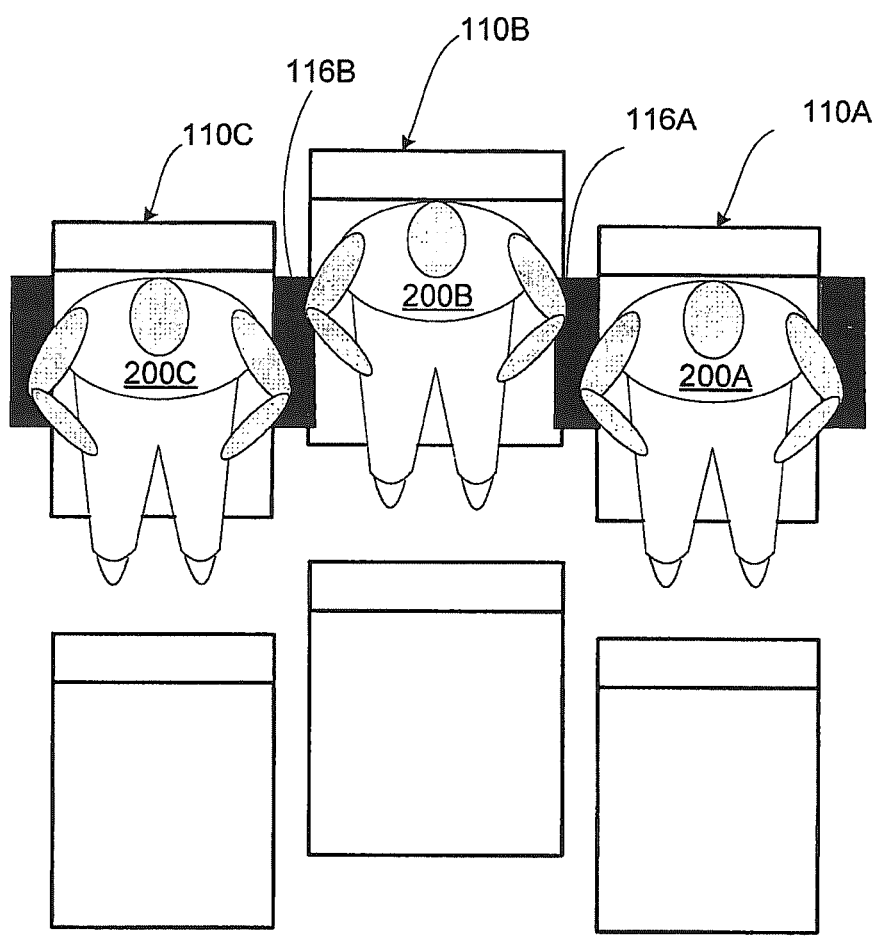
FIG. 12 illustrates passengers in a staggered seat set.

Each of the seats 110A-110C (hereafter seat 110 unless specifically referenced) includes a seat surface 112 and a seat back 114. In the three-seat arrangement illustrated in FIGS. 1A-1E, 2A-2E the outer or outboard seats 110A and 110C each include first and second armrests 116. The outboard seats 110A and 110C are disposed on either side of the middle seat 110B. For purposes of discussion, and not by way of limitation, seat 110A is referred to as the aisle seat and seat 110C is referred to as the window seat. However, it will be appreciated that the seat set may be utilized in a central row in an aircraft cabin and that such nomenclature is utilized by way of convenience and not by way of limitation. In use, a passenger 200B sitting in the middle seat 110B shares the armrests 116 with passengers 200A and 200C occupying the aisle seat 110A and window seat 110C. This is illustrated in FIG. 12, which is more fully discussed herein.

In the present embodiment, the aisle seat 110A is movably mounted to the frame 120 to permit the aisle seat 110A to be selectively moved relative to the middle seat 110B. This is illustrated in FIGS. 2A-2E. As shown, aisle seat 110A may be moved from a first position that is adjacent to the middle seat 110B (see FIG. 1A) to a second position where the aisle seat 110A is disposed over and in front of the middle seat 110B (see FIG. 2A). This movement of the aisle seat 110A permits increasing the width of the aisle between first and second seat sets disposed in a common row of an aircraft cabin.

Figure 3:
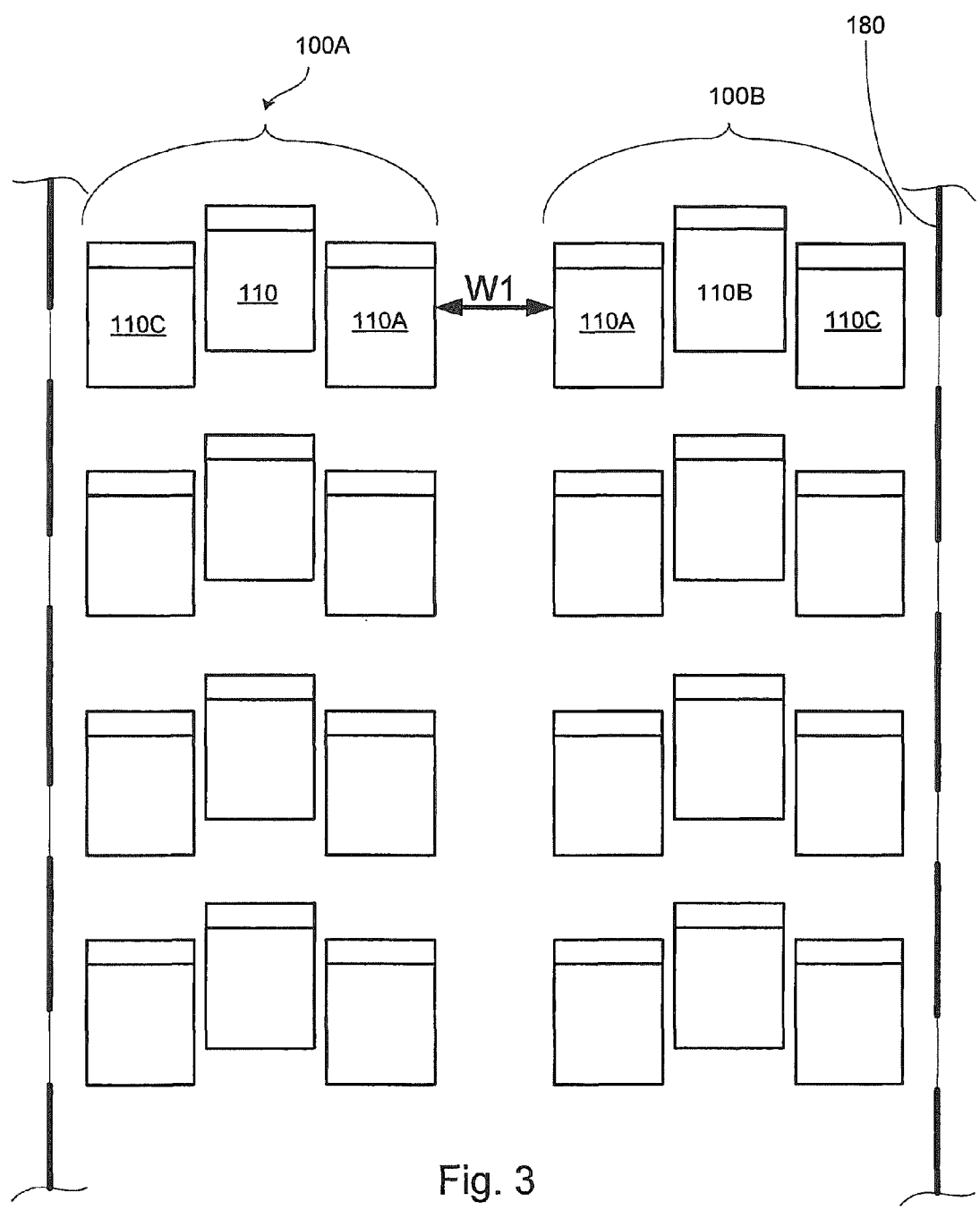
FIG. 3 illustrates an aircraft cabin having rows of seat sets in an extended position.
Figure 4:
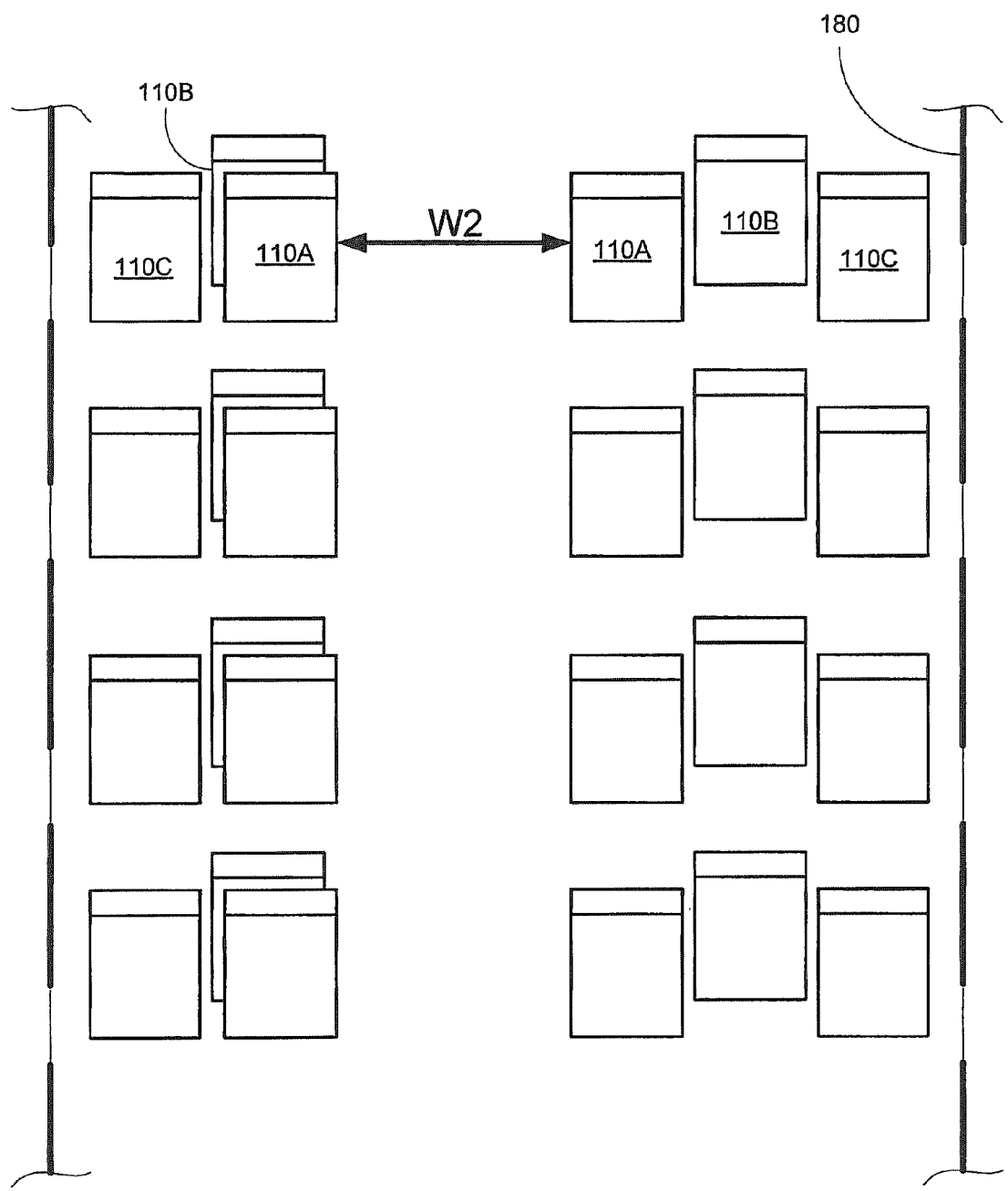
FIG. 4 illustrates the aircraft cabin of FIG. 3 having a starboard set of seats sets in a retracted position.

Referring to FIG. 3, an exemplary aircraft cabin is illustrated having a plurality of starboard seat sets 100A and a corresponding plurality of port seat sets 100B. As illustrated, the starboard and port seats set 100A, 100B are disposed in common rows along the length of the aircraft cabin 180 and define an aisle 160 there between. When the aisle seat 110A of the first seat set 100A is disposed adjacent to the middle seat 110B of the first seat set 100A (e.g., flight position), the aisle 160 has a first width W1. In an enplaning and deplaning configuration, the aisle seat 110A of the first seat set 100A is disposed over and in front of the middle seat 110B of the first seat set 100A. In this configuration, the aisle 160 has a second width W2 that is significantly increased in relation to the first width W1. See FIGS. 3 and 4. It will be appreciated that in this configuration (e.g., enplaning and deplaning configuration), the increased aisle width W2 allows for passengers to pass by one another within the aisle 160. Further, it will be appreci-ated that both seat sets 100A and 100B may include a movable aisle seat 110A such that the overall width of the aisle may be yet further increased.

Figure 5A:
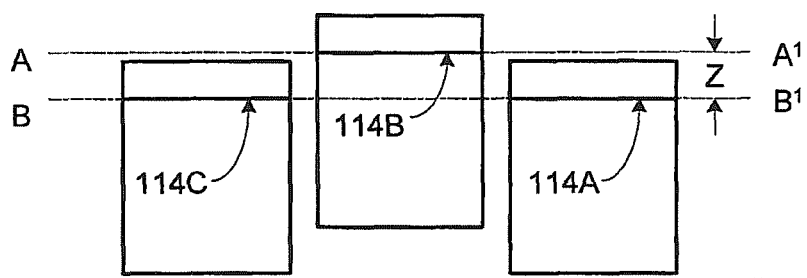
FIG. 5A illustrates a top view of a seat set in an extended position.
Figure 5B:
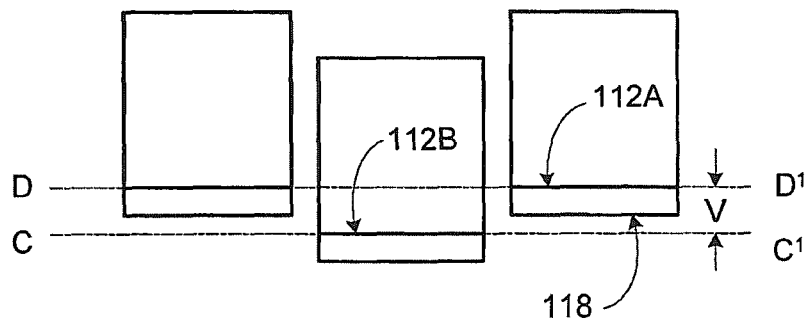
FIG. 5B illustrates a front view of a seat set in an extended position.
Figure 6A:
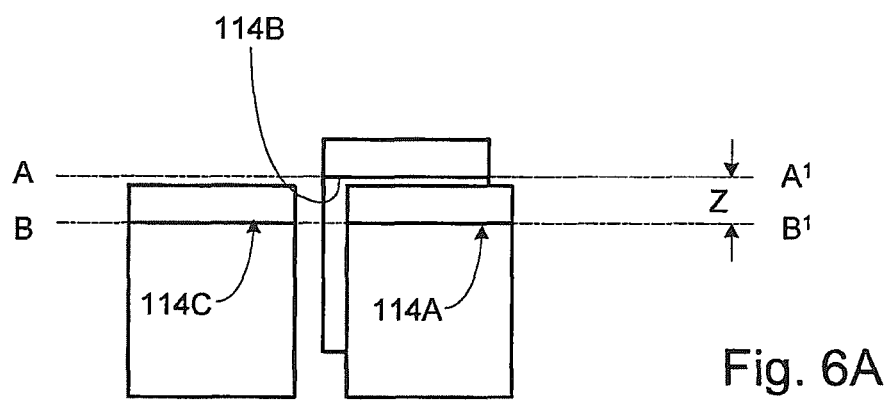
FIG. 6A illustrates a top view of a seat set in a refracted position.
Figure 6B:
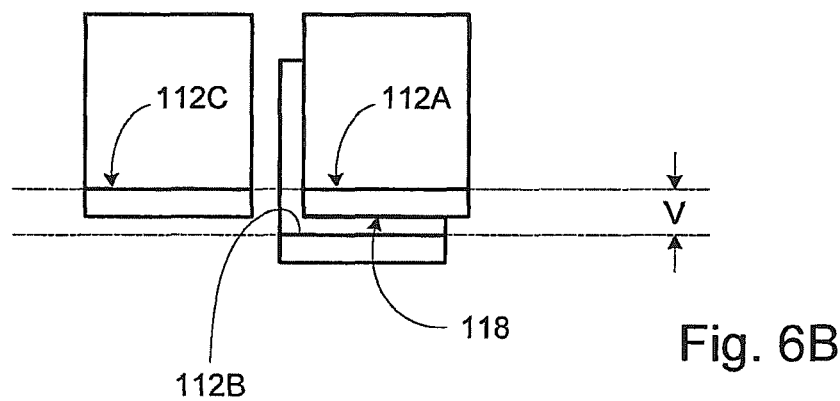
FIG. 6B illustrates a front view of a seat set in a retracted position.

To allow the aisle seat 110A of the seat set 100 to move between a fixed flight position (e.g., adjacent to middle seat 110B) to an enplaning and deplaning position (e.g., a retracted position) over the middle seat 110B, the seat set 100 utilizes a staggered seat arrangement. Specifically, the seating surface 112B of the middle seat 110B is disposed below the seating surface 112A of the aisle seat 110A. Furthermore, the seat back 114B is disposed behind the seatback 114A of the aisle seat 110A. This is further illustrated in FIGS. 2A-2E, 5A, 5B, 6A and 6B. FIGS. 5A and 6A illustrate a top view of the seat set 100, and FIGS. 5B and 6B illustrate a front view of the seat set 100. As shown in the top view of FIGS. 5A and 6A, the front surface of the seat back 114B of the middle seat 110B generally defines a reference plane A-A'. In the present embodiment, the surfaces of the seat backs 114A and 114C of the outboard seats 110A and 110C are likewise disposed in a common plane B-B'. Though being discussed as being in a common plane, it will be appreciated that the surfaces of these seatbacks 114 need not be planer. What is important is that the seatback 114B of the center seat 110B is disposed a distance behind the plane of the outboard seat(s) 110A, 110C. More specifically, the surface of the seat back 114B is disposed behind the rearward surface of 126A of the aisle seat 110A. Stated otherwise, reference plane A-A' is located behind (e.g., in the z direction) the plane B-B' of the outboard seats 110A and 110C. Likewise, referring to FIGS. 5B and 6B it is noted that the top surface of the seating surface 112B of the center seat 110B is disposed in a plane C-C' that is located beneath the plane D-D' of the seat surfaces 112A, 112C of the outboard seats 110A and 112C. Likewise, the top surface 112B of the center seat 110B is disposed below the bottom surface 118A of the aisle seat 110A. Stated otherwise, reference plane C-C' is located a vertical distance V below reference plane D-D' such that at least the movable aisle seat 110A is disposed above and forward in relation to the middle seat 110B. As will be appreciated, this allows for sliding the aisle seat 110A from its position adjacent to the middle seat 110B (see for example FIG. 1D) to a position over and in front of the middle seat (see FIG. 2D).

Figure 7:
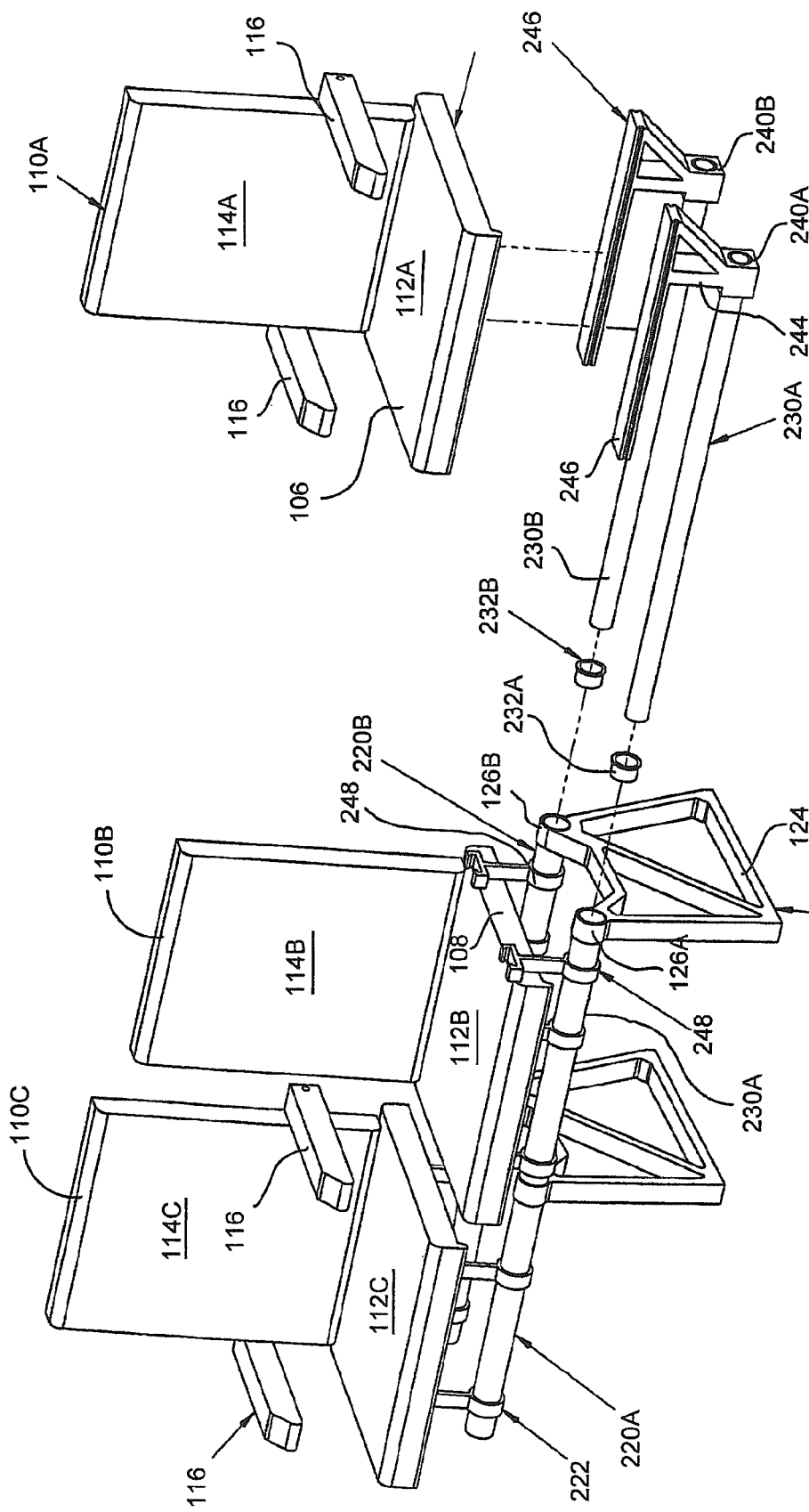
FIG. 7 illustrates a slide mechanism to allows an aisle seat to move relative to an inboard seat.

The ability to move the aisle seat 110A from a position adjacent to the middle seat 110B to a position over and in front of the middle seat 110B requires the use of a sliding member that supports the aisle seat 110A. One embodiment of a sliding mechanism 210 is illustrated in FIG. 7. As shown, the slide mechanism 210 utilizes first and second tube-in-tube or sleeve-in-arm slide members. Specifically, the slide mechanism utilizes forward and aft sleeves 220A, 220B that receive forward and aft arms 230A, 230B. The sleeves 220A, 220B are hollow tubular members that are sized to receive the arms 230A, 230B within their hollow interior. In this regard, the arms 230A, 230B may move relative to the sleeves 220A, 220B.

As shown, the sleeves 220A, 220B are fixably interconnected to an upper portion of the frame 120. As shown, the frame 120 include first and second support trusses that are spaced and have feet 124 that are adapted for connection to the floor surface on an aircraft cabin. Typically, these feet 124 are adapted to engage tracks within the floor of the aircraft cabin. However, this is not a requirement. In the present embodiment, the upper portion of the frames include first and second bores 126 that are sized to conformably receive the outside surface of the forward and aft sleeves 220A, 220B, respectively. Further, the sleeves may be fixably attached within the bores 126A, 126B utilizing, for example, adhesives, set screws or permanent attachments (e.g., welding).

In the present embodiment, the middle seat 110B and window seat 110C are fixably interconnected to the frame 120 via connection to the forward and aft sleeves 220A, 220B. Specifically, support brackets 222 are utilized to interconnect a bottom surface of the seating surfaces 112B and 112C to the sleeves 220A, 220B. See also FIGS. 1B and 2B. In the present embodiment, a first end of the support brackets 122 forms a horizontal mount 224 on which the bottom surface of the seating surface 112 rests. Further, it will be appreciated the horizontal mount 224 may include apertures that allow for attaching the bottom surface of the seat to the horizontal mount utilizing, for example, threaded fasteners. Other connection methods are possible and considered within the scope of the present invention. A second end of the support bracket includes a receiving annulus 226 that defines a bore that is sized to received the outside surface of one of the sleeves 220A, 220B. Again, this annulus 226 may be fixably attached to the outside surface of the sleeve utilizing adhesives, fasteners, and/or permanent attachment. Typically, each seat 110B, 110C utilizes four support brackets 222 to fixably attach the respective seat 110 to the forward and aft sleeves 220A, 220B and, hence, the frame 120. However, it will be appreciated that these seats 110B and 110C may be attached to the frame utilizing other linkages.

As illustrated in FIGS. 1B, 1D, 2B, 2D, and 7, the support brackets 222 that support the inboard or window seat 110C are longer than the support brackets 222 that support the middle seat 110B. This permits the window seat to be disposed above the surface of the center seat as discussed above. However, it will be appreciated that in other embodiments that the window seat 110C and middle seat 110B may be located in a common plane. In such an arrangement, these seats 110B, 110C may utilize identical support brackets 222.

In contrast to the middle seat 110B and window seat 110C that are fixably interconnected to the frame 120 via the forward and aft sleeves 220A, 220B, the aisle seat is fixably interconnected to the forward and aft arms 230A, 230B to permit the aisle seat to move relative to the frame 120 and, hence, center seat 110B.

To facilitate movement of the arms 230A, 230B relative to the sleeves 220A, 220B, guide bushings 232A, 232B may be inserted within the internal bore of the sleeves 220A, 220B. These bushings 232A, 232B may be formed of a low-friction polymer material such as PTFE. However, other materials may be utilized. Once disposed within the open ends of the sleeves 220A, 220B, the arms 230A, 230B may be disposed through the bushings 232A, 232B and into the hollow interior of the sleeves 220A, 220B.

In order to attach the aisle seat 110A to the arms 230A, 230B, each of the arms 230 includes a support frame 240. These support frames 240 are fixably interconnected proximate to an aisle end of their respective arm 230. As shown, the frames 240 each include a lower bore 242 that is sized to receive the aisle end of the arm 230 therein. Again, this end of the arm 230 may be fixably interconnected within the bore 242 in any appropriate manner. Each frame 240 further includes one or more risers 244 that extend above the bore 242 to a seat support track 246. The seat support track is interconnected to the riser 244 and extends parallel to the arm 230 in a direction toward the middle seat 110B (i.e., toward the bulkhead of the aircraft cabin). The seat support tracks 246 provide a surface on which the bottom of the aisle seat 110A may be interconnected utilizing, for example, threaded fasteners. The seat support tracks 246 are cantilevered elements. In this regard, while being substantially parallel to their respective arm 230, the inside bulkhead ends of the seat support tracks 246 are not interconnected to their respective arm 230. In this regard, when the aisle seat 110A moves from a position adjacent to the center seat (see FIG. 1D) to a position in front of and above the center seat (see FIG. 2D), the bulkhead end of the support tracks 246 may be positioned above the top surface of the center seat 110. That is, when the aisle seat is in the refracted position, the inside edge of 106 of the aisle seat 110 is cantilevered over the top surface of the middle seat 110B.

Figure 8A:
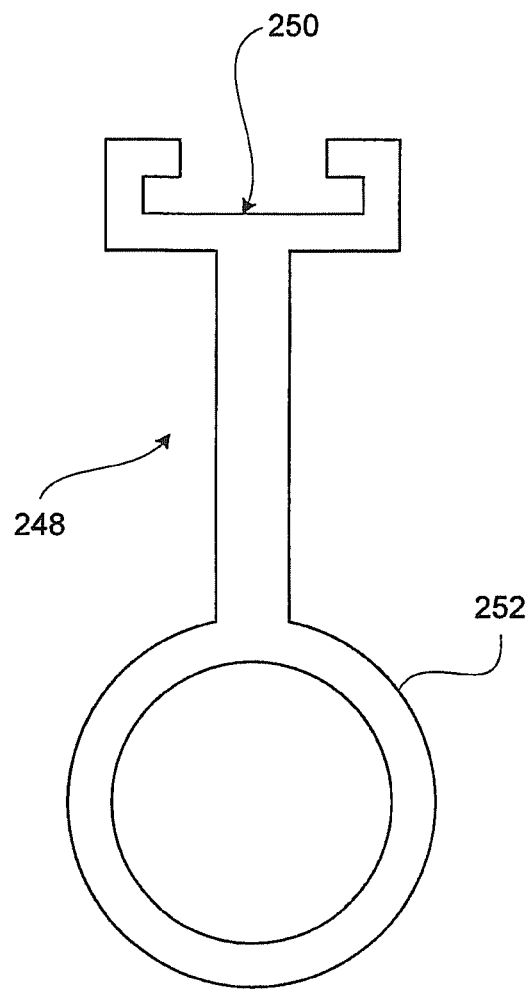
FIG. 8A illustrate a seat track guide.

In order to support the inside edge 106 of the aisle seat 110 in the flight position when the aisle seat 110 is disposed adjacent to the middle seat 110B (see FIGS. 1A and 1C), a slide assembly 210 utilizes seat support guides 248. These seat support guides 248 have a lower end, which in the current embodiment includes an annulus 252 that defines a bore, which receives one of the forward and aft sleeves 220A, 220B. A body of the seat support guide extends above the sleeves and terminates in a support surface 250. One embodiment of the seat support guide 248 is illustrated in FIG. 8A. As shown, the support surface 250 defines a t-slot on the upper end of the seat support guide 248.

Figure 8B:
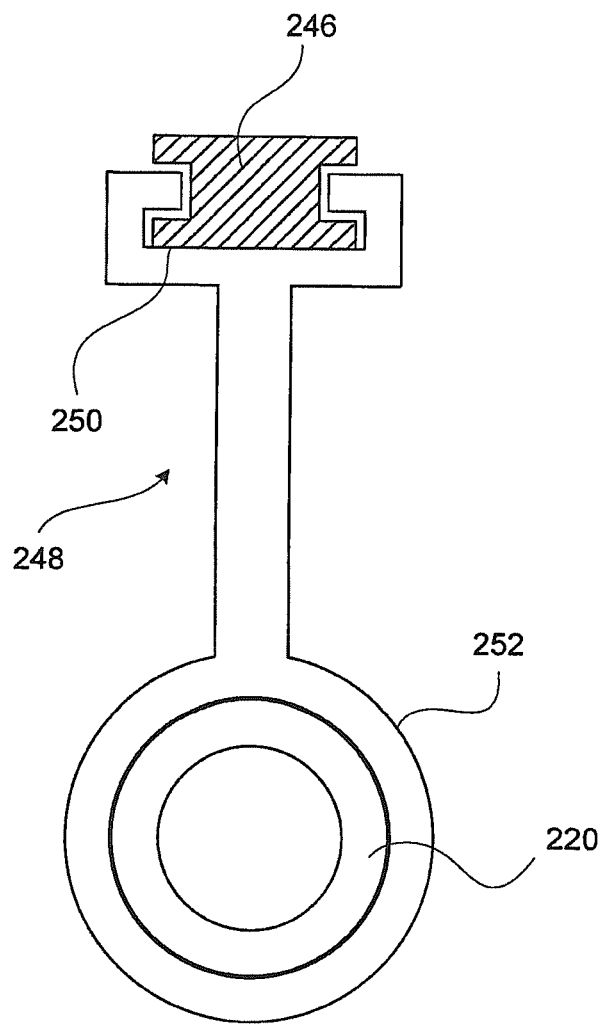
FIG. 8B illustrates a seat track guide engaging a seat track.

FIG. 8B illustrates the seat support guide 248 as engaged by the seat support track 246. As shown, the seat support track 246 is complementarily shaped to the t-slot of the support surface 250 such that when the seat support track 246 is disposed within the seat support guide, movement is restrained up and down. However, the seat support track 246 is able to slide through the t-slot of the support surface 250 to permit horizontal movement as the aisle seat 110A moves relative to the frame and center seat 110B. FIG. 8B further illustrates the sleeve 220 being disposed through the bore defined by annulus 252. While illustrating one embodiment of a seat support guide, it will be appreciated that variations may exist. For instance, the guide 248 may be interconnected to the frame rather than the sleeve 220. Further, low friction coatings may be utilized to facilitate movement of the seat support track 246 relative to the support surface 250. In addition, it will be appreciated that other support surfaces are possible and within the scope of the present invention. For instance, the support surface may include rollers or bearings and other low-friction surfaces. What is important is that the inside edge 106 of the aisle seat is supported when it is in the retracted position such that the seat 110A meets all structural requirements.

Figure 9:
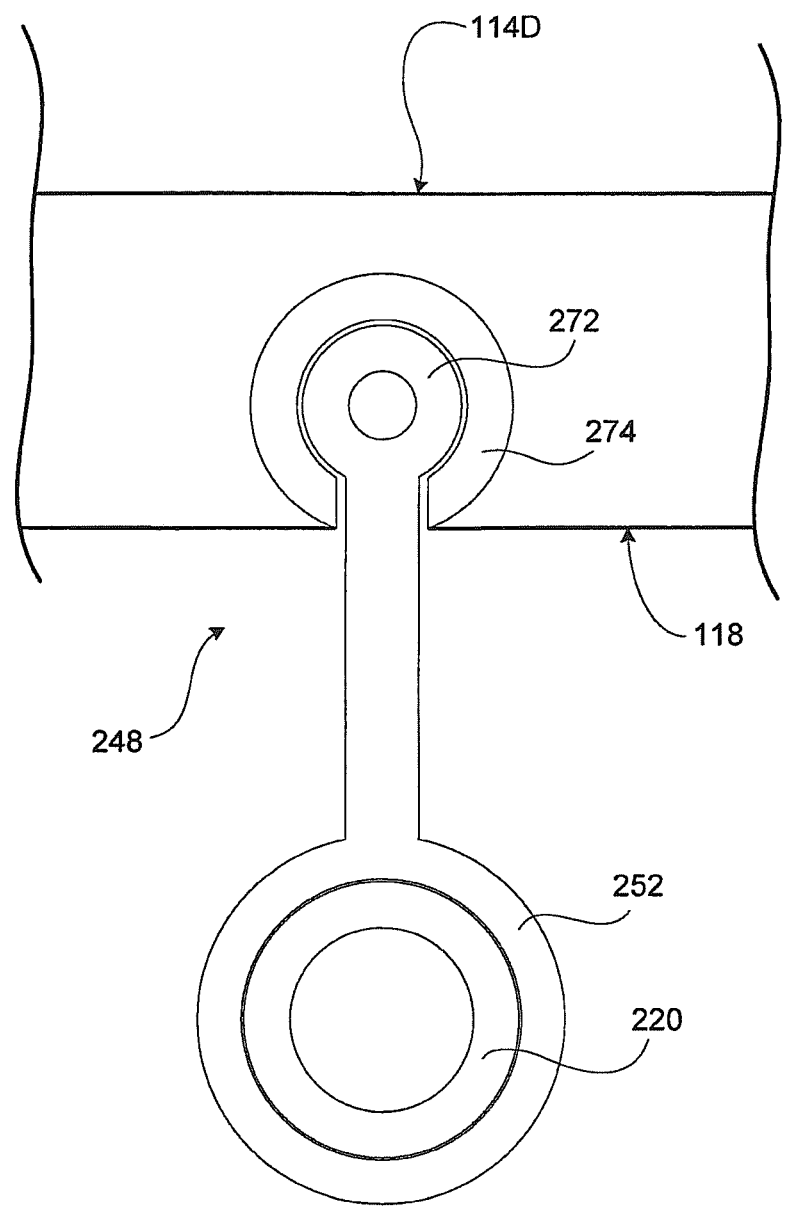
FIG. 9 illustrate another embodiment of seat track guide.

FIG. 9 illustrates another embodiment of seat support guide 248. In this embodiment, the seat support guide includes a seat guide element 272 that is received within a track 274 that is recessed into the bottom surface 118 of the seat surface 114A of the first seat. In this embodiment, the bottom surface 118 of the first seat may be disposed in substantially the same plane as the top of the seat surface of the center seat. Accordingly, when the first seat is cantilevered above the center seat, the seat surface of the center seat may support the first seat surface if a passengers sits on it.

In the present embodiment, the seat support guides 248 are positioned proximate to the outside edge 108 of the middle seat 110B. When the aisle seat 110A is disposed proximate to the center seat 110B (e.g., see FIGS. 1A and 7), these seat support guides 248 are covered by the bottom of the seating surface 112A. In this regard, a passenger of the middle seat 110B does not have contact with the seat support guides 248.

The ability to selectively move the aisle seat 110A between an extended flight position adjacent to the middle seat 110B and in a retracted position requires the ability to lock the aisle seat in its flight position. Different mechanisms may be utilized to maintain the aisle seat in a fixed position. FIGS.

10A-10D illustrate one embodiment of such a mechanism. As illustrated in FIGS. 10A-10C, the lock mechanism 250 includes a locking pin 252 that may be selectively engaged within an aperture 254 in the arm 230 and an aperture 256 in the sleeve 220 when these apertures 254, 256 are aligned. FIGS. 10A and 10B illustrate cross sectional views of a location along the length of the sleeve 220 and arm 230 where the apertures 256 and 254 are aligned. As illustrated in FIG. 10A, the locking pin 252 may be disposed through the apertures to maintain a fixed position of the arm 230 and sleeve 220. FIG. 10B illustrates the situation where the pin 252 is retracted such that the aisle seat may move, for example, to the retracted position above and in front of the middle seat. That is, by retracting the pin 252, the arm 230 is free to move relative to the sleeve 220, and the aisle seat 110A may be moved laterally relative to the center seat 110B.

FIG. 10C illustrates one embodiment of the locking mechanism 250 that may be disposed within the interior of the arm 230. As shown, the locking mechanism utilizes a rocker arm 258 having a first end 260 that is interconnected to an actuating element (e.g., rod, cable, etc.) and a second end 262 that is interconnected to the locking pin 252. When the actuating element 264 is disposed to the left as illustrated in FIG. 10C, a biasing element (e.g., spring 266) is compressed and the second end 262 of the rocker element 258 is disposed away from the aperture 254 in the arm 220 and retract the pin 252. In contrast, when the actuating element moves to the right, the biasing element 266 expands and the second end 262 of the rocking element is disposed toward the aperture 254 and the pin 252 passes through the aperture 254 and, if aligned with the aperture 256 in the sleeve 220, is displaced there through.

The actuating element 264 may be operated by any appropriate mechanism. For instance, a pull pin disposed on the end of the bracket 240 of the arm 230 may be utilized. In a further arrangement, the aisle arm 116 of the aisle seat 110A may be adapted to move between a first position and a second position. See FIG. 10D. Accordingly, this arm 116 may be interconnected to the rocker element via appropriate mechanical linkages such that when the arm is disposed, for example, inward the rocking element 258 withdraws the pin 252 relative to the aperture 254. Accordingly, moving the arm 116 back outward towards its flight position releases the rocker 252 and allows the pin to ride on the inside surface of the sleeve until it engages a locking aperture 256 within the sleeve 220.

Figure 11:
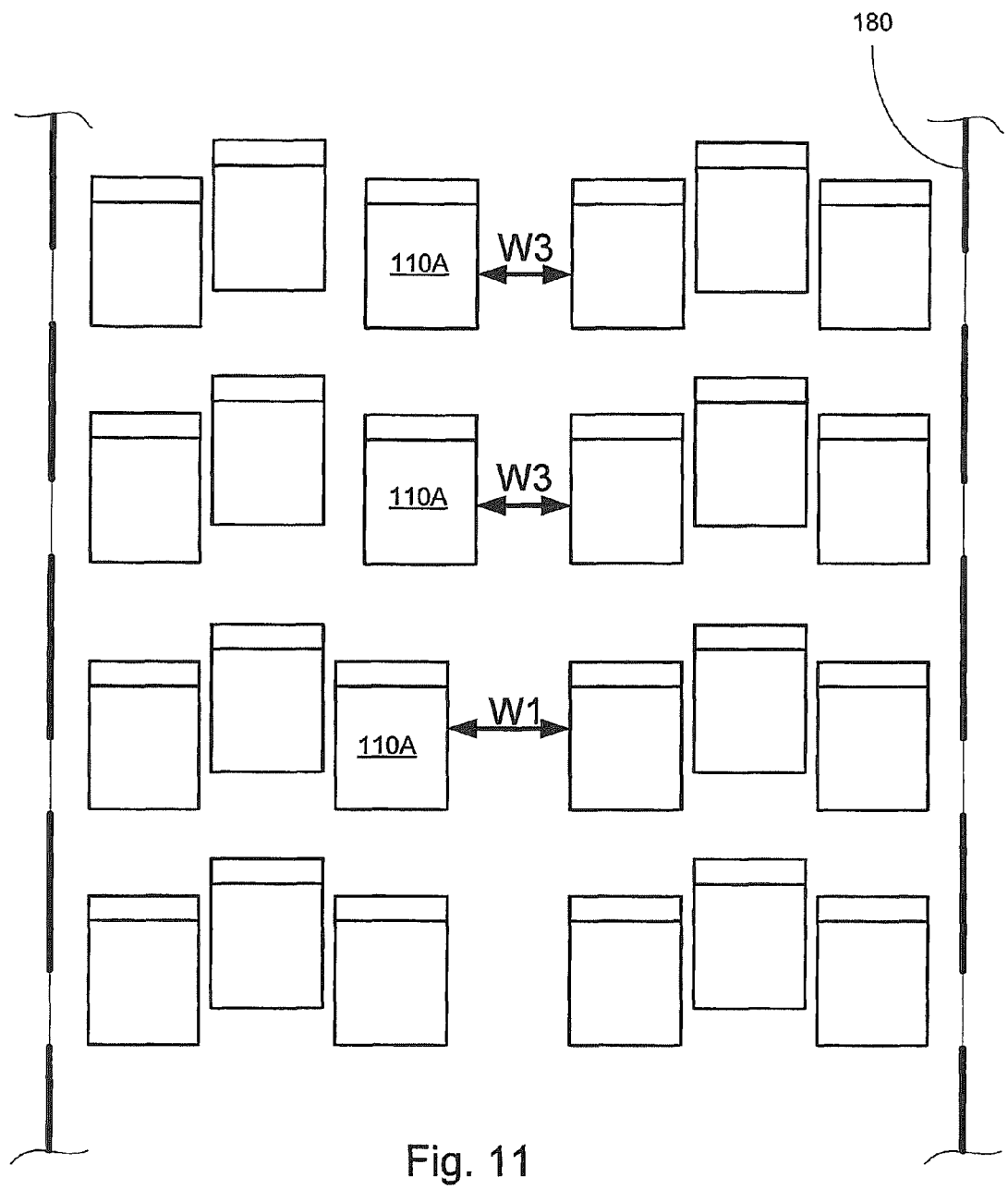
FIG. 11 illustrates an aircraft cabin having aisle seats in a further extended position.

The ability to move the aisle seat 110A relative to the center seat 110B in addition to allowing for increasing the width of the aisle during enplaning and deplaning conditions provides a further benefit. Specifically, as illustrated in FIG. 11, the ability to move the aisle seat 110A may further allow for increasing the width of the middle seat during flight. That is, it may be possible to move one or more of the aisle seats 110A further into the aisle thereby decreasing the aisle width from an initial width of W1 to a reduced width of W3 during the flight. Such movement may allow for accommodating passengers having increased girth.

Figure 13:
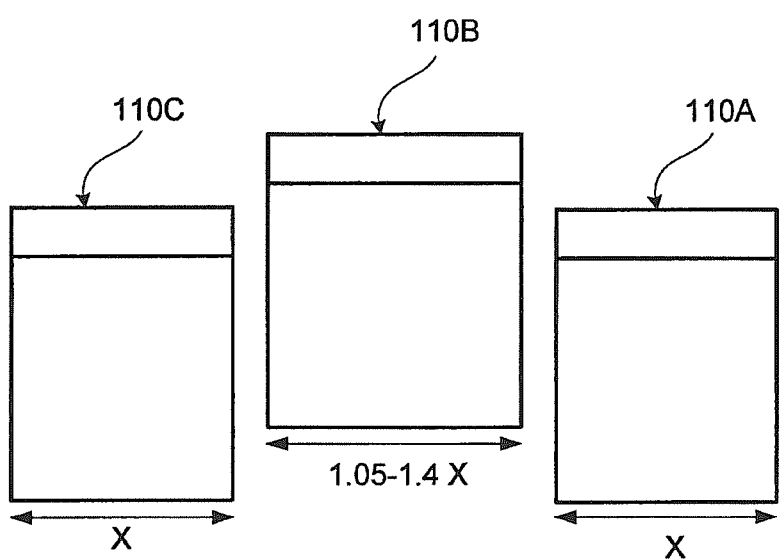
FIG. 13 illustrates a staggered seat set having varying widths.

Utilization of the staggered seat arrangement discussed above provides additional benefits for passengers of an aircraft. As illustrated in FIG. 12, three passengers 200A-200C positioned in seats 110A-110C are provided a further additional benefit. Specifically, the passengers 200A-C are staggered with the seats 110-110C and, therefore, are each afforded a different section of their shared armrest 116A, 116B. In this regard, the passengers 200A-C are able to more fully spread out and realize the benefit of the seat appearing to have more room. Further, as the seats appear to provide additional elbow room, the widths of the individual seats may be varied. As illustrated in FIG. 13, in one embodiment, the middle seat 110B may have a width that is greater than the width of the outboard seats 110A, 110C. For instance, the center seat may have a width that is 1.05 to 1.4 times the width of the outboard seats. In this regard, the outboard seats 110A, 110C may be slightly narrowed to provide a seat set 100 that has the same footprint as a seat set having three identical seats. In such an arrangement, the outboard seats 110A, 110C may be uniform in size to allow for interchangeability. However, the ability to increase the center seat may allow for providing additional room for passengers having increased girth.

Figure 14B:
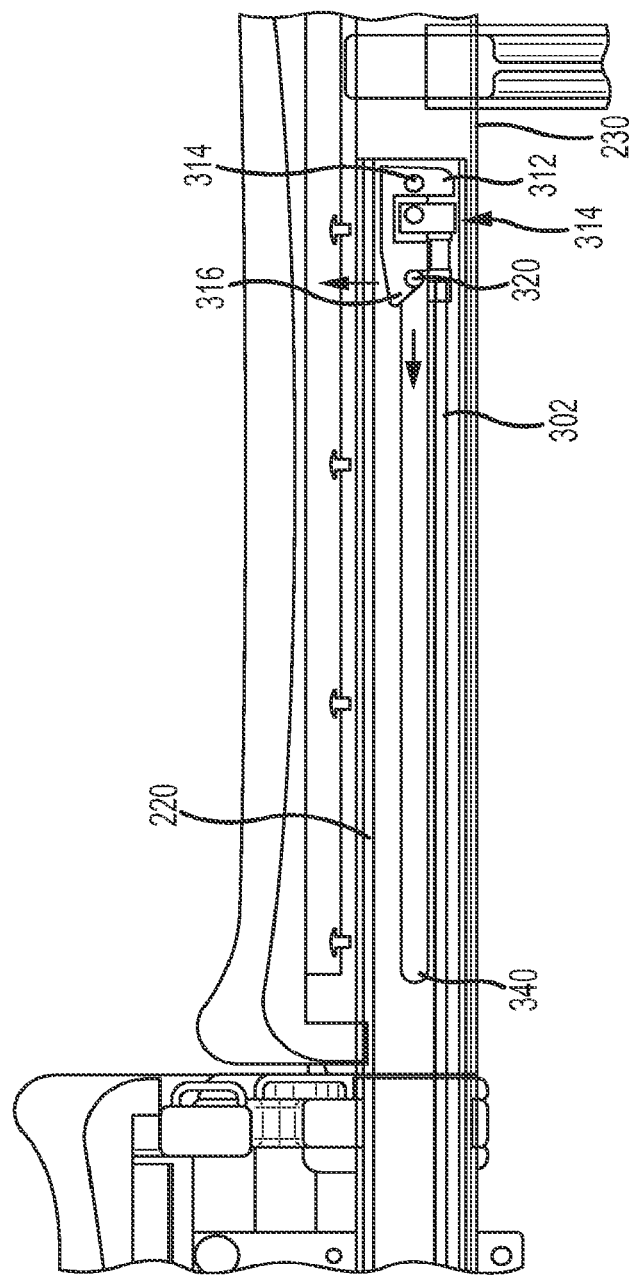

FIGS. 14A and 14B illustrate one embodiment of an actuator assembly 300 that allows for selectively releasing/locking the outboard seat 110A. As shown, the actuator assembly includes a cable 302, which extends between an upper portion of the seat back of the outboard seat 110A through the interior of the arm 220 and terminates at a latch assembly 310. The cable extends through a protective sleeve to prevent binding of the cable. As shown in FIG. 14A, a first end of the cable 302 is interconnected to a button 304, which may be depressed by user to displace the cable 302 within the sleeve. A second end of the cable is interconnected to a latch 312 that is pivotally connected about an axis 314. Specifically, upon depressing the button 304, the latch 312 pivots about the axis 314 raising the catch end 316 of the latch 312. The catch and 316 of the latch 312 includes a detent that is sized to selectively engage a pin at 320 that extends through the sleeve 230, which receives the inner arm 220. The pin may be fixedly interconnected to the outer sleeve 230.

As shown, the latch assembly 310 is fixedly interconnected within the distal end of the internal arm 220. In this regard, the cable and latch assembly are operative to move with the outboard seat 110 as it moves between the deployed and retracted positions. In this regard, there is no change in the length of the cable during operation. That is, the length of the cable remains constant in the deployed and retracted positions of the outboard seat. This simplifies the construction and operation of the actuator mechanism.

In order to allow the internal sleeve 220 move past the pin 320, the internal sleeve 220 includes an elongated aperture 340. Thus, as internal arm 220 moves from a deployed position to a retracted position, the pin 320 moves along the length of the elongated aperture 340. In FIG. 14A, the outboard seat 110A, is not fully retracted in the latch assembly 310 has not engaged the pin 320. As illustrated in FIG. 14B, the outboard seat (not shown) is fully refracted and the latch assembly 310 engages the pin 320.

During movement of the outboard seat between the deployed position and the retracted position, it is possible to apply torque to the seat which can cause binding of the internal arm within the sleeve. In order to counteract this torque, one embodiment of the slide assembly utilizes a roller assembly 248 as illustrated in FIG. 15. These roller assemblies each have a lower end, which in the current embodiment includes an annulus 252, which defines a bore sized to receive one of the forward and aft sleeves 220A, 220B. A body of the roller assembly extends above the sleeves and terminates in a support surface, which in the present embedment is formed of a roller 250 that moves in a channel that extends across the seat. As shown, when the roller is disposed within the channel, movement is restrained up and down. However, the roller has a diameter that is slightly less than the width of the channel and is therefore able to roll along the top or bottom surface of the channel to permit horizontal movement of the outboard seat 110A as it moves relative to the frame and center seat 110B. Further, the limited movement between the roller and channel reduces or substantially eliminates torque applied to the seat which may result in binding during movement.

Figure 16:
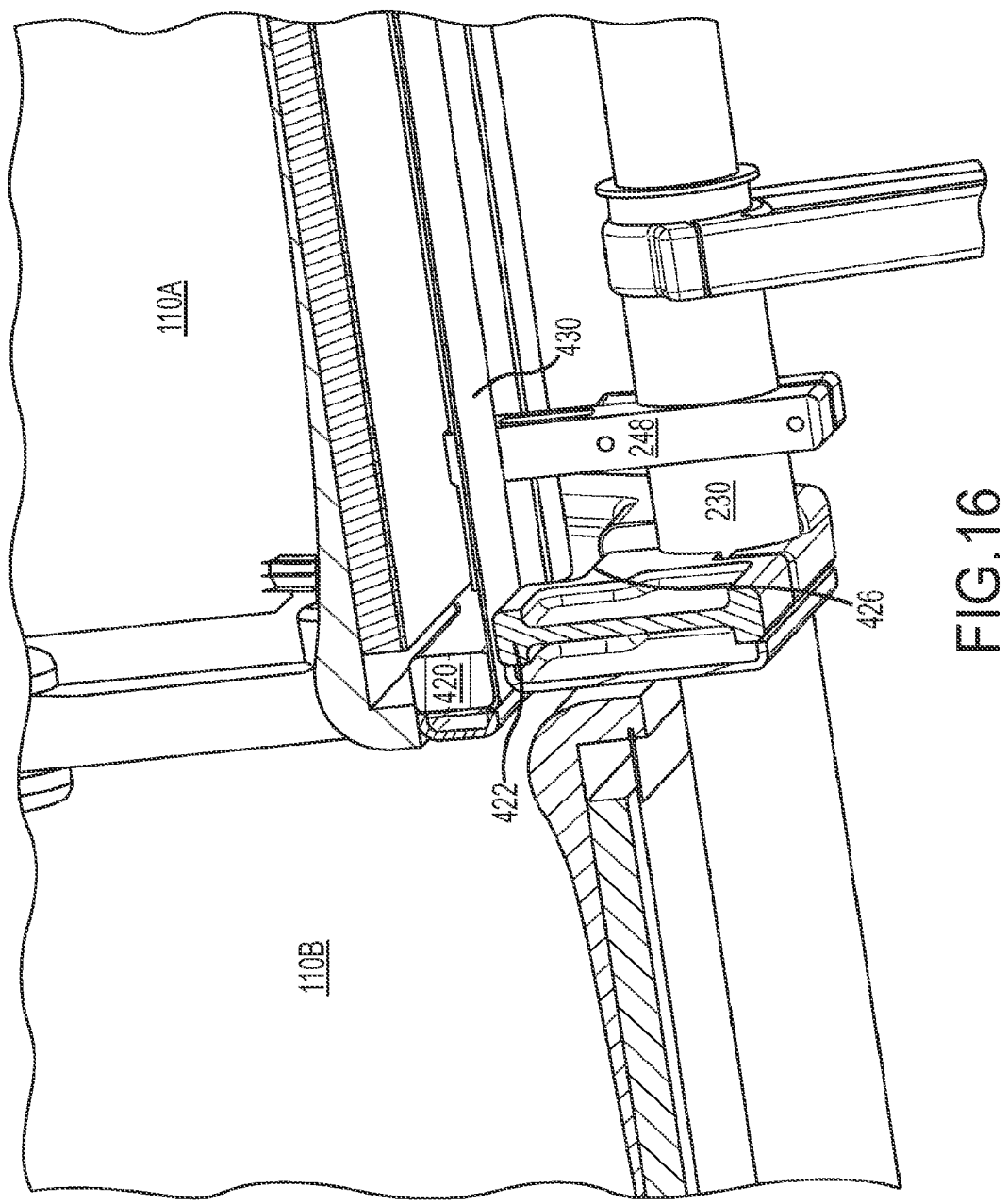
FIG. 16 illustrates a non-rigid covering for a bottom surface of the moving seat.

In order to support the inside edge of the aisle or outboard seat 110A in the deployed flight position, a seat frame 420 rests on top of a support frame 422, which is interconnected to the forward and aft sleeves 230 (only one shown for illustration), see FIG. 16. In this embodiment, when a passenger sits on the seat 110 A, the seat frame 420 rests on the top surface of the support frame 422 providing a solid support surface. To reduce or eliminate the potential of items becoming stuck between the aisle/outboard seat 110A and the middle seat 110B during movement between the retracted and deployed positions, this embodiment of the seat assembly utilizes a non-rigid covering 430 (e.g., fabric, etc.) that is disposed over a bottom portion of the movable seat 110A. As shown, the non-rigid covering 430 extends around and outside portion of the seat frame 420 and is disposed between the seat frame 420 and the support frame 422. The non-rigid covering extends across the bottom of the seat in all areas where the seat frame 420 is in mating engagement with the support frame 422. In this regard, as the seat 110A moves from a retracted position to the deployed position, the non-rigid covering 430 prevents items from being disposed within and above the surface of the seat frame such that they may become pinched between the seat frame 420 and support frame 422 at the end of the seat deployment. In other embodiments, the covering may be made of a rigid element.

In the present embodiment, the covering 430 does not extend over the entire bottom surface of the outboard seat 110A. As shown, the seat frame 422 has a recessed portion 426 that allows for placement of the seat belt for the outboard seat 110A. Accordingly, as there is space between the recessed portion 426 and the overlying seat frame 420, this bottom portion of the outboard seat may not include the non-rigid covering 430

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. An aircraft seat assembly, comprising:
   a seat frame having a lower end configured for attachment to an aircraft floor;
   a first seat fixedly attached to an upper portion of said seat frame, said first seat having a first seating surface and a first seat back;
   a slide member movably supported by said seat frame and configured to move laterally between a first position and a second position relative to said seat frame;
   a second seat attached to said slide member, said second seat having a second seating surface and a second seat back, wherein an inside edge of said second seat is disposed substantially adjacent to an outside edge of said first seat in said first position, and wherein a bottom surface of said second seating surface is disposed over at least a portion of a top surface of said first seating surface in said second position, and wherein said second seat back is disposed in front of at least a portion of said first seat back in said second position; and
   a lock configured to lock said slide member in at least one of said first and second positions relative to said frame.

2. The seat assembly of claim 1, further comprising:
   a third seat disposed adjacent to an inside edge of said first seat, said third seat having
   a third seating surface and a third seat back.

3. The seat assembly of claim 2, wherein top surfaces of said second seating surface and said third seating surface are disposed vertically above a horizontal reference plane defined by a top surface of said first seating surface.

4. The seat assembly of claim 1, wherein at least a portion of said lock is fixedly connected to said second seat.

5. The seat assembly of claim 4, further comprising:
   a cable linkage extending between said lock and an actuator, wherein a portion of said cable extends through an interior of said slide member and is operative to move with said second seat between said first and second positions.

6. The seat assembly of claim 1, wherein said slide member comprises:
   an internal sleeve and an external sleeve, wherein said internal sleeve moves relative to said external sleeve.

7. The seat assembly of claim 6, wherein said lock further comprises:
   a catch connected to said internal sleeve; and a pin connected to the external sleeve, wherein said catch selectively engages said pin to lock said second seat in one of said first and second positions.

8. The seat assembly of claim 1, further comprising:
   a channel disposed laterally across a bottom surface of said second seating surface;
   and a roller attached to said seat frame, wherein said roller is disposed within channel and said channel laterally over said roller as said slide member moves between said first position and said second position.

9. The seat assembly of claim 1, further comprising:
   a non-rigid covering disposed over the bottom surface of said second seating surface.

* * * * *